United States Patent [19]

Higuchi et al.

[11] Patent Number: 4,734,802
[45] Date of Patent: Mar. 29, 1988

[54] FILM MAGNETIC HEAD SLIDER HAVING A CONTACTING PORTION CONTAINING ZIRCONIA AND CARBON

[75] Inventors: Shinsuke Higuchi; Yukio Takeda, both of Hitachi; Shiro Iijima, Mito; Masaki Ohura; Sadanori Nagaike, both of Odawara, all of Japan

[73] Assignee: Hitachi, Ltd., Tokyo, Japan

[21] Appl. No.: 782,536

[22] Filed: Oct. 1, 1985

[30] Foreign Application Priority Data

Oct. 2, 1984 [JP] Japan .................. 59-205609
Nov. 29, 1984 [JP] Japan .................. 59-252701

[51] Int. Cl.$^4$ .................. G11B 5/60; G11B 5/187; G11B 15/64; G11B 17/32
[52] U.S. Cl. .................. 360/103; 360/122; 501/105
[58] Field of Search .......... 360/103, 122, 110, 129, 360/120, 102; 501/103, 105, 89, 87

[56] References Cited

U.S. PATENT DOCUMENTS

| 3,432,314 | 3/1969 | Mazdiyasni | 501/103 |
| 3,565,645 | 2/1971 | Anderson | 360/103 |
| 4,048,714 | 9/1977 | Huntt | 360/122 |
| 4,317,147 | 2/1982 | Daughenbaugh et al. | 360/122 |
| 4,409,633 | 10/1983 | Watanabe et al. | 360/122 |
| 4,430,279 | 2/1984 | Hagio et al. | 501/103 |
| 4,430,440 | 2/1984 | Wada et al. | 501/105 X |
| 4,441,132 | 4/1984 | Morita et al. | 360/122 |
| 4,443,825 | 4/1984 | Wank et al. | 360/104 |

FOREIGN PATENT DOCUMENTS

| 2810134 | 9/1979 | Fed. Rep. of Germany | 360/103 |
| 0089915 | 7/1980 | Japan | 360/122 |
| 56-14474 | 2/1981 | Japan | 360/103 |
| 0137516 | 10/1981 | Japan | 360/122 |
| 57-188453 | 11/1982 | Japan | 360/103 |
| 58-121179 | 7/1983 | Japan | 360/103 |
| 58-181766 | 10/1983 | Japan | 51/103 |
| 59-45969 | 3/1984 | Japan | 360/103 |
| 0308990 | 7/1971 | U.S.S.R. | 360/103 |
| 0485175 | 9/1975 | U.S.S.R. | 360/103 |

OTHER PUBLICATIONS

Refractories, vol. 14, No. 3-4, pp. 244-246, Mar./Apr. 1973, "Zirconia Stabilized with Yitrium and Aluminum Oxide", by Andreeva.
Magnesium Electron LTD, "An Introduction to Zirconia", by Stevens, Jun. 1983, Publication No. 113.
Groben et al., "Wear Coating for a Tape Head", I.B.M. Tech. Disc. Bull., vol. 9, No. 9, Feb. 1967, p. 1085.

Primary Examiner—Stuart N. Hecker
Assistant Examiner—Alfonso Garcia
Attorney, Agent, or Firm—Antonelli, Terry & Wands

[57] ABSTRACT

A film magnetic slider which comprises a slider performing contact-start-stop actions on a recording medium and being provided with a film magnetic head device on the side end of the slider, at least the recording-medium-contacting part of the slider being made from a sintered material having a thermal conductivity of not more than 0.02 cal/cm.sec.°C. and an average crystal grain size of not more than 5 μm has a good slidability on the recording medium and a good machinability and can improve the life of the recording medium.

7 Claims, 2 Drawing Figures

4,734,802

FILM MAGNETIC HEAD SLIDER HAVING A CONTACTING PORTION CONTAINING ZIRCONIA AND CARBON

BACKGROUND OF THE INVENTION

This invention relates to a film magnetic head slider and a process for preparing a material for the film magnetic head slider, and particularly to a film magnetic head slider suitable for use in a magnetic recorder where the slider contacts with and slides on a recording medium, and to a process for preparing a material for the film magnetic head slider.

In the field of magnetic disc recorders, film magnetic heads have been manufactured and contact-start-stop (CSS) systems have been used to meet the recent higher recording density and higher recording capacity requirements.

In FIG. 1, one example of the structure of a film magnetic head is shown, where a circuit member 2 containing a film transducer is provided at one end of a slider 1.

In the CSS system, the magnetic head slider flies usually at a small clearance of 0.2 to 0.5 μm over the magnetic disc to increase the recording density, but contacts with and slides on the magnetic disc surface at the start and stop to rotate the magnetic disc. Furthermore, the magnetic head slider flies with a small flying height even during the flying period, and thus if the magnetic disc has flaws, tiny projections, or dusts on the surface, the magnetic disc has correspondingly a higher contact or sliding frequency. Under these circumstances, the reliability of a magnetic recorder greatly depends on the sliding characteristics of the magnetic head slider.

As a material for the magnetic head slider, not single crystals, but polycrystals and sintered materials are used on the grounds of low production cost, etc. For example, sintered $Al_2O_3$-TiC material is disclosed in U.S. Pat. No. 4,251,841 as such a material. Such a material has a good wear resistance and a good machinability, but its sliding characteristics fail to satisfy the desired reliability. That is, the binder which covers the magnetic disc surface is softened due to the heat of sliding friction and is liable to stick to the magnetic head to cause so called head crash. To overcome these disadvantages, it has been proposed in Japanese Patent Application Kokai (Laid-open) Nos. 56-111,166, 56-47,956, 56-107,326, and 56-169,264 to impregnate or overcoat the magnetic disc-facing side of the slider with a good lubricating material. However, the effect cannot be maintained for a long time with a thin overcoating, whereas with a thick overcoating, the clearance from the head to the magnetic disc recording surface is larger, and thus the recording density and the recording precision are adversely influenced thereby. In the case of impregnating the pores in the sintered material with a good lubricating material, the slidability can be improved, but the magnetic head may stick to the magnetic disc owing to the excretion of the lubricating material from the pores.

Japanese Patent Application Kokai (Laid-open) No. 58-121,179 discloses a magnetic head slider made from zirconia ceramics, where the applicable zirconia ceramics are selected only in view of their density, and there still are machining problems.

SUMMARY OF THE INVENTION

An object of the present invention is to provide a film magnetic head slider with a distinguished sliding durability.

Another object of the present invention is to provide a film magnetic head slider with a good machinability, which can improve the life of a magnetic disc.

Other object of the present invention is to provide a process for preparing a material for the film magnetic head slider.

According to a first aspect of the present invention, a film magnetic head slider is provided, which comprises a slider performing contact-start-stop actions on a recording medium and being provided with a film magnetic head device on the side end of the slider, at least the recording medium-contacting part of the slider being made from a sintered material having a thermal insulation high enough to thermally decompose and carbonize a binder on the recording medium during sliding on the recording medium and an average crystal grain size of not more than 5 μm.

According to a second aspect of the present invention, a process for preparing a film magnetic head slider material is provided, which comprises firing a mixture of $ZrO_2$ powders, a sufficient amount of a stabilizer to stabilize the $ZrO_2$ powders in the cubic system at room temperature, and a grain growth controller at a sintering temperature of 1,100° to 1,800° C. while hot pressing the mixture, thereby obtaining a sintered material containing $ZrO_2$ in the cubic system as the main components and having an average crystal grain size of not more than 5 μm and a thermal conductivity of not more than 0.02 cal/cm.sec.°C.

The present inventors have taken into account the softening characteristics of coating binders laid on magnetic discs to obtain a magnetic head slider with good sliding characteristics. That is, the binder undergoes thermal decomposition and carbonization with increasing temperature after passage through a softening region, as shown in FIG. 2. FIG. 2 schematically shows the relationship between the hardness of a binder and the temperature. Thus, in the case of a magnetic head slider made from a sintered material not having a low thermal conductivity, the attainable temperature of a binder due to the heat of sliding friction will be as high, and the temperature-increasing rate of the binder will be lower, and consequently the residence time of the binder in the softening region will be longer. That is, the magnetic head is liable to stick to the magnetic disc. On the other hand, in the case of a magnetic head slider made from a sintered material having a low thermal conductivity, the attainable temperature of the binder will be higher, and the temperature-increasing rate will be higher and thus the residence time of the binder in the softening region will be shorter. Consequently, the magnetic head hardly sticks to the magnetic disc. The higher the attaining temperature of the binder, the more progressed are the thermal decomposition and carbonization of the binder. That is, the carbonized binder will serve as a good lubricant, and the sliding life can be much more improved.

However, when the thermal conductivity is lower, the thermal shock will be correspondingly larger. Furthermore, when the magnetic head slider is used for a prolonged time, the release of crystal grains from the sintered material is inevitable owing to mechanical shocks at the contact with and sliding of the magnetic head slider on the magnetic disc. The larger the released crystal grains, the larger the damages to the magnetic disc, that is, the larger the sliding scars. This will also lower the life of the magnetic disc.

Since the magnetic head slider flies with a small clearance from the magnetic disc surface, as described before, the magnetic head slider is liable to contact with and slide on the disc surface due to even very small projections. The larger the projections, the more often the frequencies of contacting and sliding and the larger the degree thereof. This will also lead to a disadvantage. In other words, the size of crystal grain in the sintered material must be much smaller to reduce the damages to the magnetic disc and improve the sliding life of the magnetic disc.

Another advantage of smaller sizes of crystal grains is an improvement in the machinability. The larger the size of crystal grains, the larger the chippings formed on the sintered material during the machining. The chippings cause a damage to the magnetic disc, and thus a strict quality inspection is usually carried out in the preparation of magnetic head sliders. The smaller sizes of crystal grains mean reduction in the sizes of chippings and also an increase in the quality inspection passing.

The present inventors have found that a magnetic head slider made from a sintered material having a thermal conductivity of not more than 0.02 cal/cm-sec.°C. and an average crystal grain size of not more than 5 $\mu$m has an improved sliding life, a good machinability, and can improve the life of a magnetic disc. Though the crystal grains are liable to be released from the magnetic head slider owing to the low thermal conductivity, as described before, the amount of the binder layer (as integrated with the magnetic layer) of the magnetic disc that are scraped off by the released crystal grains and the defects, i.e. the size of the concave parts on the magnetic disc-facing side of the slider during the sliding is smaller, because the sizes of released crystal grains and the defects on the magnetic disc-facing side of the slider are smaller, and consequently the life of the magnetic disc can be improved thereby.

One of the most preferable sintered materials having such characteristics as described above is a sintered $ZrO_2$ material comprising crystal grains having an average crystal grain size of not more than 5 $\mu$m. The sintered $ZrO_2$ material, when made from the single $ZrO_2$ by sintering, undergoes phase transformation from the tetragonal system to the monoclinic system during cooling and changes in volume, and consequently cracks are liable to occur. Thus, an appropriate amount of oxides of Ca, Mg, Y, etc., which is generally called stabilizer, is usually added to the single $ZrO_2$ at the sintering, and subjected to solid solution, whereby the crystal phase of $ZrO_2$ can be obtained in a stable cubic system or in a mixture of cubic system and tetragonal system even by cooling to room temperature. It is possible to adjust the ratio of tetragonal system by changing the amount of the stabilizer to be added, but the material containing the tetragonal system besides the cubic system is known as a material of high strength and high toughness and is very hard to machine. Thus, the mixing ratio of the cubic system is at least 70% by weight, preferably at least 90% by weight, and most preferably the sintered $ZrO_2$ material is entirely in the cubic system.

Any sintered $ZrO_2$ material containing various components can attain the objects of the present invention, as long as it has a thermal conductivity of not more than 0.02 cal/cm.sec.°C. and an average crystal grain size of not more than 5 $\mu$m.

Particularly in the preparation of a film magnetic head slider comprising $ZrO_2$ as the main component according to the present invention, a sintered $ZrO_2$ material having a thermal conductivity of not more than 0.02 cal/cm.sec.°C. and containing crystal grains of $ZrO_2$ in the cubic system having an average grain size of not more than 5 $\mu$m as the main component can be obtained by firing a mixture of powdery $ZrO_2$ and a sufficient amount of a stabilizer to stabilize $ZrO_2$ in a cubic system at room temperature and a grain growth controller at a sintering temperature of 1,100° to 1,800° C. in a non-oxidative atmosphere while hot pressing the mixture.

Sintered $ZrO_2$ material in the cubic system has such a problem that chipping over the allowable range often occurs during machining, but the present inventors have found that such chipping occurrence can be suppressed by making the crystal grains finer.

The powdery $ZrO_2$ raw material for use in the present process can partially contain or can be entirely $ZrO_2$ in the tetragonal or monoclinic system, so long as it contains a sufficient amount of the stabilizer powder of $Y_2O_3$, etc. to transform all $ZrO_2$ into a cubic sytsem, but preferably the powdery $ZrO_2$ raw material is entirely in the cubic system.

As the grain growth controller, for example, carbon in the form of simple carbon powder can be added to the raw material mixture, but it is desirable to add thereto an organic material that can be decomposed at a temperature below the sintering temperature while leaving carbon as a residue, for example, a solution of phenol resin in an appropriate solvent. In this case, it is preferable to add thereto 0.01 to 1% by weight of the grain growth controller in terms of carbon content in the sintered $ZrO_2$ material. Furthermore, it is preferable to use the raw material powdery mixture having an average particle size of not more than 0.1 $\mu$m.

As described above, the powdery mixture is molded and fired at a sintering temperature of 1,100° to 1,800° C. in a non-oxidative atmosphere while hot pressing the mixture. If the sintering temperature is below 1,100° C., the resulting sintered material fails to become thoroughly dense, and has a high porosity, and the powdery stabilizer, if used, fails to undergo thorough solid solution. On the other hand, if the sintering temperature exceeds 1,800° C., the crystal grains in the sintered material considerably grow, resulting in poor machinability and particularly increasing chippings.

The thus obtained sintered maaterial has finer crystal grains and has a more distinguished machinability and particularly the chipping occurrence is suppressed.

PREFERRED EMBODIMENTS OF THE INVENTION

Example 1

Figure 1:
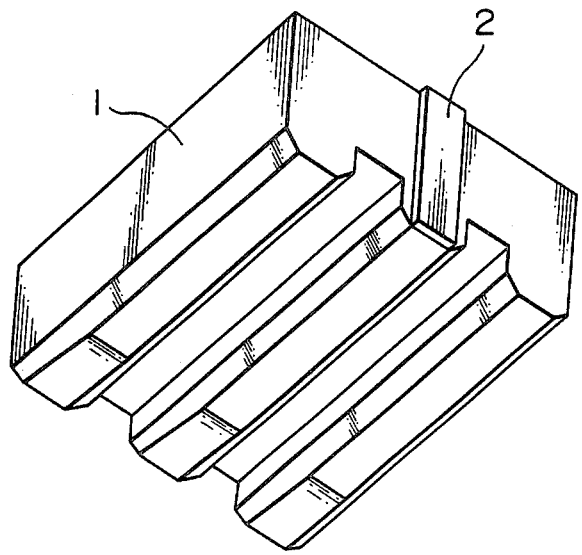
FIG. 1 is a view schematically showing the structure of a film magnetic head.
Figure 2:
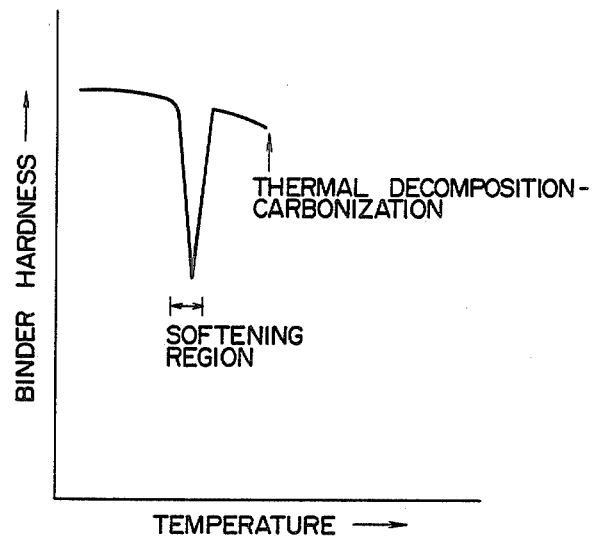
FIG. 2 is a diagram schematically showing the relationship between the hardness of the binder of a recording medium and the temperature.

Sintered materials shown in Table 1 were used in magnetic head sliders. In Table 1, "average crystal grain size" is a cubic average crystal grain size determined by etching the polished surface of a sintered material, measuring an average crystal grain size of about 200 crystal grains on the enlarged photograph of the polished surface according to Intercept method (Cord method) and multiplying the average crystal grain size by the statistical coefficient 1.56. "Thermal conductivity" is a value at room temperature determined with a sample having a thickness of about 1 mm according to Pulse method.

Sintered $ZrO_2$-8 mol% $Y_2O_3$ materials were found to be all in the cubic system by X-ray diffraction.

The sliding characteristics of magnetic head sliders made from the sintered materials shown in Table 1 were evaluated according to the so called contact-start-stop (CSS), where the magnetic head transiently slides on the magnetic disc at the start and the stop to rotate the magnetic disc.

In Table 2, CSS life (CSS runs) and machining defect ratio are shown, where "CSS life" is the number of runs till the head crash determined by conducting the contact-start-stop run at a circumferential velocity of 50 m/sec and "machining defect ratio" shows a frequency of defect occurrence when the sintered material is machined into a magnetic head slider, as compared with the frequency of defect occurrence of sintered material No. 1 in Table 1 as unity.

CSS operation is repeated at every on-off action of the switch to the magnetic recorder, and it can be presumed that the switch is subject to at least one on-off action in a day under the normal operating conditions of the magnetic recorder, and thus CSS will be at least 300 runs in a year (CSS runs will be much increased in view of the occurrence of unexpected contact and sliding). Thus, the desirable CSS life is at least 3,000 runs in view of the working reliability of a magnetic recorder for the duration of 10 years.

It is seen from Table 2 that, when the thermal conductivity of sintered materials is not more than 0.02 cal/cm.sec.°C., the CSS life is at least 2,000 runs (No. 1 to 9), whereas, when the thermal conductivity is 0.04 cal/cm.sec.°C., the CSS life is less than 1,000 runs.

It is also seen from Table 2 that, when the average crystal size is not more than 5 μm, the machining defect ratio is smaller, whereas, when the average crystal grain size is about 8 μm, the machining defect ratio is remarkably larger. It is seen that the smaller machining defect ratio when the average crystal grain size is not more than 5 μm is only due to machining maloperation such as careless dimensional error, etc., whereas the larger machining defect ratio when the average crystal grain size is about 8 μm is mainly due to the occurrence of chippings.

Microscopic observation of chippings revealed that the chippings occurred in the crystal grain units. That is, it is seen that, when the average crystal grain size is not more than 5 μm, the chipping sizes are smaller, and no machining defects due to the occurrence of chippings appear.

TABLE 1

| No. | Sintered material | Average crystal grain size [μm] | Thermal conductivity [cal/cm · sec · °C.] |
| --- | --- | --- | --- |
| 1 | $ZrO_2$-8 mol % $Y_2O_3$ | 1.9 | 0.005 |
| 2 | $ZrO_2$-8 mol % $Y_2O_3$ | 5.0 | 0.005 |
| 3 | $ZrO_2$-8 mol % $Y_2O_3$ | 8.2 | 0.005 |
| 4 | Mn—Zn ferrite ($Fe_2O_3$-32 mol % MnO -15 mol % ZnO | 2.2 | 0.014 |
| 5 | Mn—Zn ferrite ($Fe_2O_3$-32 mol % MnO -15 mol % ZnO | 4.8 | 0.014 |
| 6 | Mn—Zn ferrite ($Fe_2O_3$-32 mol % MnO -15 mol % ZnO | 8.0 | 0.014 |
| 7 | TaN | 2.1 | 0.02 |
| 8 | TaN | 5.0 | 0.02 |
| 9 | TaN | 8.1 | 0.02 |
| 10 | $Al_2O_3$-30 wt % TiC | 1.8 | 0.04 |
| 11 | $Al_2O_3$-30 wt % TiC | 4.9 | 0.04 |
| 12 | $Al_2O_3$-30 wt % TiC | 7.8 | 0.04 |

TABLE 2

| No. | CSS life (runs) | Machining defect ratio |
| --- | --- | --- |
| 1 | 103214 | 1 |
| 2 | 100435 | 1.2 |
| 3 | 96509 | 8.7 |
| 4 | 9562 | 0.8 |
| 5 | 6272 | 1.1 |
| 6 | 5121 | 4.8 |
| 7 | 5543 | 1.1 |
| 8 | 3088 | 1.5 |
| 9 | 2014 | 5.6 |
| 10 | 983 | 0.9 |
| 11 | 921 | 1.0 |
| 12 | 832 | 6.6 |

The life of magnetic discs was investigated with magnetic head sliders made from the sintered materials Nos. 1, 2 and 3 in Table 1. It was found that the sintered materials Nos. 1 and 2 could make the life of magnetic discs 2.2 times and 1.7 times longer than the sintered material No. 3, resectively.

Example 2

Sintered $ZrO_2$ materials containing stabilizers shown in Table 3 were made into magnetic head sliders. In Table 3, the ratio of cubic system was determined by X-ray diffraction. The average crystal grain size and the thermal conductivity were determined in the same manner as in Example 1.

TABLE 3

| No. | Stabilizer | Ratio of cubic system [wt. %] | Average crystal grain size [μm] | Thermal conductivity [cal/cm · sec · °C.] |
| --- | --- | --- | --- | --- |
| 13 | 6 mol % $Y_2O_3$ | 90 | 1.9 | 0.005 |
| 14 | 6 mol % $Y_2O_3$ | 90 | 4.8 | 0.005 |
| 15 | 6 mol % $Y_2O_3$ | 90 | 8.2 | 0.005 |
| 16 | 10 mol % $Y_2O_3$ | 100 | 2.2 | 0.004 |
| 17 | 10 mol % $Y_2O_3$ | 100 | 5.1 | 0.004 |
| 18 | 10 mol % $Y_2O_3$ | 100 | 8.1 | 0.004 |
| 19 | 20 mol % CaO | 100 | 2.0 | 0.004 |
| 20 | 20 mol % CaO | 100 | 4.9 | 0.004 |
| 21 | 20 mol % CaO | 100 | 7.8 | 0.004 |
| 22 | 20 mol % MgO | 100 | 2.1 | 0.004 |
| 23 | 20 mol % MgO | 100 | 5.0 | 0.004 |
| 24 | 20 mol % MgO | 100 | 7.9 | 0.004 |

The sliding characteristics and machinability of the magnetic head sliders made from the sintered materials shown in Table 3 were investigated in the same manner as in Example 1. The results are shown in Table 4.

TABLE 4

| No. | CSS life (runs) | Machining defect ratio |
| --- | --- | --- |
| 13 | 102867 | 1.1 |
| 14 | 100362 | 1.3 |
| 15 | 91456 | 5.9 |
| 16 | 108748 | 1.0 |
| 17 | 102533 | 1.1 |
| 18 | 81613 | 6.2 |
| 19 | 110418 | 1.1 |
| 20 | 112644 | 1.2 |
| 21 | 91665 | 6.6 |
| 22 | 112681 | 1.0 |
| 23 | 110689 | 1.2 |
| 24 | 91674 | 7.0 |

It is seen from Table 4 that the sintered $ZrO_2$ materials having a thoroughly low thermal conductivity are about 100 times better in the sliding characteristics than the conventional sintered $Al_2O_3$-30 wt. % TiC materials (No. 10 to 12 in Example 1), and that, when the average crystal grain size of the sintered materials is not more than 5 μm, the machining defects occur less, whereas, when the average crystal grain size is much more than 5 μm, the frequency of machining defects is increased.

Example 3

To $ZrO_2$ (cubic system) powders ($ZrO_2$-8 mol% $Y_2O_3$) having an average particle size of 0.02 μm were added solutions of novolak phenol resin in alcohol in ratios of 0, 0.02, 1.0, 2.0 and 3.0% by weight on the basis of the resulting mixtures, respectively, and the resulting mixtures were thoroughly mixed in ball mills. Then, the mixtures were dried, and molded by pressing, and fired at a sintering temperature of 1,600° C. in vacuum under a hot press pressure of 600 kg f/cm² for one hour.

In Table 5, the characteristics of the resulting sintered materials are shown. With zero% by weight of the carbon content, the average crystal grain size was undesirably much more than 5 μm, whereas with 1.5% by weight of the carbon content, the porosity was undesirably much larger and the frictional resistance of the sintered materials became smaller owing to the contained carbon.

The machinability of sintered materials Nos. 26–28 was investigated. No machining defects due to the chippings were found. The CSS life was more than 100,000 runs in all these sintered materials.

TABLE 5

| No. | Resin added [%] | Carbon content [%] | Porosity [%] | Average crystal grain size [μm] | Thermal conductivity [cal/cm · sec · °C.] |
| --- | --- | --- | --- | --- | --- |
| 25 | 0 | 0 | 0 | 7.5 | — |
| 26 | 0.02 | 0.01 | 0 | 2.0 | 0.005 |
| 27 | 1.0 | 0.5 | 0 | 1.1 | 0.005 |
| 28 | 2.0 | 1.0 | 5 | 0.7 | 0.005 |
| 29 | 3.0 | 1.5 | 26 | — | — |

Example 4

Sintered materials were prepared in the same manner as in Example 3, except that the sintering temperature was 1,750° C. in place of 1,600° C.

In Table 6, the characteristics of the resulting sintered materials are shown. With 0.01 to 1% by weight of the carbon content, the porosity was smaller, and the average crystal grain size was not more than 5 μm.

Machinability of sintered materials Nos. 31 to 33 were investigated, and the defects due to the chippings were not found. Furthermore, the CSS life of these sintered materials was investigated, and found to be more than 100,000 runs.

X-ray diffraction of the sintered materials No. 32 and 33 revealed that there was a weak ZrC peak.

TABLE 6

| No. | Resin added [%] | Carbon content [%] | Porosity [%] | Average crystal grain size [μm] | Thermal conductivity [cal/cm · sec · °C.] |
| --- | --- | --- | --- | --- | --- |
| 30 | 0 | 0 | 0 | 1.8 | — |
| 31 | 0.02 | 0.01 | 0 | 4.8 | 0.005 |
| 32 | 1.0 | 0.5 | 0 | 2.7 | 0.005 |
| 33 | 2.0 | 1.0 | 3 | 1.6 | 0.005 |
| 34 | 3.0 | 1.5 | 21 | — | — |

Example 5

To $ZrO_2$ (cubic system) powders ($ZrO_2$-8 mol% $Y_2O_3$) having an average particle size of 0.02 μm were added a solution of novolak phenol resin in acetone in a ratio of 1.0% by weight on the basis of the resulting mixture, and the mixture was thoroughly mixed in a ball mill.

The powdery mixture was molded and fired under a load of 600 kg f/cm² in a hot press, while changing the sintering temperature to 1,000° C., 1,100° C., 1,250° C., 1,400° C. and 1.500° C.

The $ZrO_2$ crystal grains in the resulting sintered materials were all found in the cubic system by X-ray diffraction.

In Table 7, the characteristics of the resulting sintered materials are shown. All the sintered materials had a thermal conductivity of 0.005 cal/cm.sec.°C. or less.

TABLE 7

| No. | Sintering temp. [°C.] | Porosity [%] | Average crystal grain size [μm] |
| --- | --- | --- | --- |
| 35 | 1000 | 28 | 0.08 |
| 36 | 1100 | 5 | 0.09 |
| 37 | 1250 | 1 | 0.1 |
| 38 | 1400 | 0 | 0.2 |
| 39 | 1500 | 0 | 1.1 |

Example 6

To $ZrO_2$ (cubic system) powders ($ZrO_2$-10 mol% $Y_2O_3$) having an average particle size of 0.05 μm were added 1.0% by weight of carbon black powders having an average particle size of 0.05 μm, and the resulting powdery mixture was pulverized and mixed in a ball mill for 24 hours. The resulting powdery mixture was then molded and fired in the same manner as in Example 5.

The $ZrO_2$ crystal grains in the resulting sintered materials were all found in the cubic system by X-ray diffraction. The characteristics of the sintered materials are shown in Table 8. All the sintered materials had a thermal conductivity of 0.005 cal/cm.sec.°C. or less.

TABLE 8

| No. | Sintering temp. [°C.] | Porosity [%] | Average crystal grain size [μm] |
|---|---|---|---|
| 40 | 1000 | 36 | 0.1 |
| 41 | 1100 | 8 | 0.1 |
| 42 | 1250 | 2 | 0.2 |
| 43 | 1400 | 0 | 0.2 |
| 44 | 1500 | 0 | 1.2 |

Example 7

To $ZrO_2$ (monoclinic system) powders having an average particle size of 0.05 μm were added 8% by mole of $Y_2O_3$ powder having an average particle size of 0.05 μm on the basis of the $ZrO_2$ powders, and further 0.1% by weight of novolak phenol resin in acetone on the basis of the resulting powdery mixture, and the resulting powdery mixture was pulverized and mixed in a ball mill for 24 hours.

The powdery mixture was molded and fired in the same manner as in Example 5.

The $ZrO_2$ crystal grains in the resulting sintered materials were all found in the cubic system by X-ray diffraction, but the sintered material fired below 1,100° C. had a broadened angle of diffraction. The characteristics of the sintered materials are shown in Table 9. All the sintered materials had a thermal conductivity of 0.005 cal/cm.sec.°C. or less.

TABLE 9

| No. | Sintering temp. [°C.] | Porosity [%] | Average crystal grain size [μm] |
|---|---|---|---|
| 45 | 1000 | 27 | 0.1 |
| 46 | 1100 | 4 | 0.1 |
| 47 | 1250 | 0 | 0.2 |
| 48 | 1400 | 0 | 0.4 |
| 49 | 1500 | 0 | 1.8 |

Example 8

To $ZrO_2$ (monoclinic system) powders having an average particle size of 0.05 μm were added 4% by mole of $Y_2O_3$ powder having an average particle size of 0.05 μm on the basis of the $ZrO_2$ powder, 6% by mole of CaO having an average particle size of 0.05 μm on the basis of the $ZrO_2$ powders, and further a solution of 1% by weight of novolak phenol resin in acetone on the basis of the resulting powder mixture, and the resulting mixture was pulverized and mixed in a ball mill for 24 hours.

Then, the powdery mixture was molded and fired in the same manner as in Example 5.

The $ZrO_2$ crystal grains in the resulting sintered materials were all found in the cubic system by X-ray diffraction. The sintered material fired below 1,100° C. had a broadened angle of diffraction.

The characteristics of the sintered materials are shown in Table 10. All the sintered materials had a thermal conductivity of 0.005 cal/cm.sec.°C. or less.

TABLE 10

| No. | Sintering temp. [°C.] | Porosity [%] | Average crystal grain size [μm] |
|---|---|---|---|
| 50 | 1000 | 32 | 0.1 |
| 51 | 1100 | 8 | 0.1 |
| 52 | 1250 | 1 | 0.2 |
| 53 | 1400 | 0 | 0.2 |
| 54 | 1500 | 0 | 1.3 |

Example 9

In place of a $ZrO_2$ (cubic system) raw material powdery mixture containing 8 mol% $Y_2O_3$ used in Example 5, $ZrO_2$ (cubic system) raw material powders containing 20% by mole of CaO, MgO, or SrO, or 30% by mole of $CeO_2$ or 35% by mole of $La_2O_3$ in the solid solution on the basis of $ZrO_2$ were used, and admixed with a solution of 1% by weight of novolak phenol resin in acetone on the basis of the resulting mixture, and the resulting mixtures were mixed in a ball mill.

Then, the mixtures were molded and fired at a sintering temperature of 1,200° C. or 1,300° C. under a load of 600 kg f/cm² for 2 hours in a hot press. The $ZrO_2$ crystal grains in the resulting sintered materials were all found in the cubic system by X-ray diffraction. The characteristics of the sintered materials are shown in Table 11. All the sintered materials had a thermal conductivity of 0.005 cal/cm.sec.°C. or less.

TABLE 11

| No. | Stabilizer | Sintering temp. [°C.] | Porosity [%] | Average crystal grain size [μm] |
|---|---|---|---|---|
| 55 | CaO | 1200 | 2 | 0.1 |
| 56 | CaO | 1300 | 0 | 0.1 |
| 57 | MgO | 1200 | 2 | 0.1 |
| 58 | MgO | 1300 | 1 | 0.2 |
| 59 | $CeO_2$ | 1200 | 3 | 0.1 |
| 60 | $CeO_2$ | 1300 | 1 | 0.2 |
| 61 | SrO | 1200 | 2 | 0.1 |
| 62 | SrO | 1300 | 1 | 0.1 |
| 63 | $La_2O_3$ | 1200 | 2 | 0.1 |
| 64 | $La_2O_3$ | 1300 | 0 | 0.2 |

Example 10

To $ZrO_2$ (monoclinic system) powders having an average particle size of 0.05 μm were added 4% by mole of $Y_2O_3$ powders having an average particle size of 0.05 μm on the basis of $ZrO_2$, and a solution of 1% by weight of novalak phenol resin in acetone on the basis of the resulting mixture, and the mixture was pulverized and mixed in a ball mill for 24 hours.

Then, the mixture was molded and fired in the same manner as in Example 5. The $ZrO_2$ crystal grains in the resulting sintered materials were all found in a mixture of the cubic system and the tetragonal system in a mixing ratio of cubic to tetragonal of 75% by weight by X-ray diffraction. The characteristics of the sintered materials are shown in Table 12. All the sintered materials had a thermal conductivity of 0.005 cal/cm.sec.°C. or less

TABLE 12

| No. | Sintering temp. [°C.] | Porosity [%] | Average crystal grain size [μm] |
|---|---|---|---|
| 65 | 1000 | 30 | 0.08 |
| 66 | 1100 | 6 | 0.08 |
| 67 | 1250 | 1 | 0.1 |
| 68 | 1400 | 0 | 0.2 |
| 69 | 1500 | 0 | 1.2 |

Example 11

$ZrO_2$ (cubic system) powders ($ZrO_2$-9 mol% $Y_2O_3$) having an average partcle size of 0.1 μm were molded and fired under a load of 600 kg f/cm² for 2 hours in a hot press, while changing the sintering temperature to 1,000° C., 1,100° C., 1,250° C., 1,400° C. and 1,500° C. The $ZrO_2$ crystal grains in the resulting sintered materials were all found in the cubic system by X-ray diffraction. The characteristics of the sintered materials are shown in Table 13. All the sintered materials had a thermal conductivity of 0.005 cal/cm.sec.°C.

TABLE 13

| No. | Sintering temp. [°C.] | Porosity [%] | Average crystal grain size [μm] |
|---|---|---|---|
| 70 | 1000 | 24 | 0.8 |
| 71 | 1100 | 3 | 1.1 |
| 72 | 1250 | 0 | 1.9 |
| 73 | 1400 | 0 | 2.9 |
| 74 | 1500 | 0 | 6.5 |

Example 12

To $ZrO_2$ (monoclinic system) powders having an average particle size of 0.1 μm were added 13% by mole of $Y_2O_3$ powders having an average particle size of 0.1 μm on the basis of $ZrO_2$, and the mixture was pulverized and mixed in a ball mill for 24 hours.

Then, the mixture was molded and fired in the same manner as in Example 5. The $ZrO_2$ crystal grains in the resulting sintered materials were all found in the cubic system by X-ray diffraction, but the sintered material fired below 1,100° C. had a broadened angle of diffraction. The characteristics of the sintered materials are shown in Table 14. All the sintered materials had a thermal conductivity of 0.005 cal/cm.sec.°C. or less.

TABLE 14

| No. | Sintering temp. [°C.] | Porosity [%] | Average crystal grain size [μm] |
|---|---|---|---|
| 75 | 1000 | 26 | 0.8 |
| 76 | 1100 | 4 | 1.0 |
| 77 | 1250 | 1 | 2.1 |
| 78 | 1400 | 0 | 3.0 |
| 79 | 1500 | 0 | 7.2 |

Example 13

To $ZrO_2$ (monoclinic system) powders having an average particle size of 0.1 μm were added 4% by mole of $Y_2O_3$ powders having an average particle size of 0.1 μm on the basis of $ZrO_2$ powders and 6% by mole of CaO powders having an average particle size of 0.1 μm on the basis of $ZrO_2$ powder, and the resulting mixture was pulverized and mixed in a ball mill for 24 hours.

Then, the mixture was molded and fired in the same manner as in Example 5. The $ZrO_2$ crystal grains in the resulting sintered materials were all found in the cubic system by X-ray diffraction. The sintered material fired below 1,100° C. had a broadened angle of diffraction.

The characteristics of the sintered materials are shown in Table 15. All the sintered materials had a thermal conductivity of 0.005 cal/cm.sec.°C. or less.

TABLE 15

| No. | Sintering temp. [°C.] | Porosity [%] | Average crystal grain size [μm] |
|---|---|---|---|
| 80 | 1000 | 25 | 0.7 |
| 81 | 1100 | 4 | 1.1 |
| 82 | 1250 | 1 | 2.0 |
| 83 | 1400 | 0 | 2.7 |
| 84 | 1500 | 0 | 6.0 |

Example 14

To $ZrO_2$ (monoclinic system) powders having an average particle size of 0.1 μm were added 4% by mole of $Y_2O_3$ powders having an average particle size of 0.1 μm on the basis of $ZrO_2$ powders, and the mixture was puluerized and mixed in a ball mill for 24 hours.

Then, the mixture was molded and fired in the same manner as in Example 5. The $ZrO_2$ crystal grains in the resulting sintered materials were all found in a mixture of the cubic system and the tetragonal system in a ratio of cubic to tetragonal of 75% by weight by X-ray diffraction.

The characteristics of the sintered materials are shown in Table 16. All the sintered materials had a thermal conductivity of 0.005 cal/cm.sec.°C. or less.

TABLE 16

| No. | Sintering temp. [°C.] | Porosity [%] | Average crystal grain size [μm] |
|---|---|---|---|
| 85 | 1000 | 25 | 0.6 |
| 86 | 1100 | 4 | 0.9 |
| 87 | 1250 | 1 | 1.6 |
| 88 | 1400 | 0 | 2.1 |
| 89 | 1500 | 0 | 6.0 |

Example 15

In place of the $ZrO_2$ (cubic system) powders containing 9% by mole of $Y_2O_3$ used in Example 11, $ZrO_2$ (cubic system) powders containing 20% by mole of CaO, MgO, or SrO, or 30% by mole of $CeO_2$ or 35% by mole of $La_2O_3$ in solid solution on the basis of $ZrO_2$ were used. The powders were molded and fired at a sintering temperature of 1,200° C. or 1,300° C. under a load of 600 kg f/cm² for 2 hours in a hot press. The $ZrO_2$ crystal grains in the resulting sintered materials were all found in the cubic system by X-ray diffraction. The characteristics of the sintered materials are shown in Table 17. All the sintered materials had a thermal conductivity of 0.005 cal/cm.sec.°C. or less.

TABLE 17

| No. | Stabilizer | Sintering temp. [°C.] | Porosity [%] | Average crystal grain size [μm] |
|---|---|---|---|---|
| 90 | CaO | 1200 | 1 | 1.4 |
| 91 | CaO | 1300 | 0 | 2.3 |
| 92 | MgO | 1200 | 2 | 1.5 |
| 93 | MgO | 1300 | 0 | 2.3 |
| 94 | $CeO_2$ | 1200 | 1 | 1.3 |
| 95 | $CeO_2$ | 1300 | 0 | 2.4 |
| 96 | SrO | 1200 | 2 | 1.3 |
| 97 | SrO | 1300 | 0 | 2.5 |
| 98 | $La_2O_3$ | 1200 | 1 | 1.5 |
| 99 | $La_2O_3$ | 1300 | 0 | 2.5 |

According to the present invention, a film magnetic head slider having a good slidability on a recording medium and a good machinability and being capable of improving the life of the recording medium can be obtained.

What is claimed is:

1. A film magnetic head slider which comprises a slider performing contact-start-stop actions on a recording medium and being provided with a film magnetic head device on a side end of the slider, at least the recording medium-contacting part of a slider being made from a sintered material containing $ZrO_2$ in the cubic system as the major component, and having an average crystal grain size of not more than 5 μm, a carbon content of 0.01 to 1% by weight, and thermal conductivity of not more than 0.02 cal/cm.sec.°C.

2. A film magnetic head slider according to claim 1, wherein said entire slider is made from said sintered material.

3. A film magnetic head slider according to claim 1, wherein the $ZrO_2$ and the carbon are thoroughly mixed.

4. A film magnetic head slider according to claim 1, wherein said sintered material further includes a stabilizer.

5. A film magnetic head slider according to claim 4, wherein said stabilizer is selected from the group consisting of $Y_2O_3$, CaO, MgO, $CeO_2$, SrO and $La_2O_3$.

6. A film magnetic head slider according to claim 1, wherein the sintered material is prepared by firing a mixture of an organic material and $ZrO_2$ powders in a non-oxidative atmosphere.

7. A film magnetic head slider according to claim 6, wherein the organic material is 0.02 to 2% by weight of novolak phenol resin on the basis of the $ZrO_2$ powders.

* * * * *